United States Patent
Voigt et al.

(10) Patent No.: US 6,984,924 B1
(45) Date of Patent: Jan. 10, 2006

(54) PIEZOELECTRIC ACTUATOR UNIT

(75) Inventors: Andreas Voigt, Regensburg (DE);
Wilhelm Frank, Bamberg (DE);
Günter Lewentz, Regensburg (DE);
Claus Zumstrull, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/529,010

(22) PCT Filed: Aug. 5, 1999

(86) PCT No.: PCT/DE99/02450

§ 371 (c)(1),
(2), (4) Date: Nov. 22, 2000

(87) PCT Pub. No.: WO00/08353

PCT Pub. Date: Feb. 17, 2000

(30) Foreign Application Priority Data

Aug. 6, 1998 (DE) .................. 198 35 628

(51) Int. Cl.
*H01L 41/053* (2006.01)
*H01L 41/083* (2006.01)

(52) U.S. Cl. ..................... 310/348; 310/328

(58) Field of Classification Search ............. 310/325, 310/328, 338, 340, 345, 346, 348
See application file for complete search history.

(56) References Cited

U.S. PATENT DOCUMENTS

| 4,174,799 | A | * | 11/1979 | d'Agnolo ................ 226/7 |
| 5,166,908 | A | * | 11/1992 | Montgomery ............. 310/328 |
| 5,410,207 | A | | 4/1995 | Miura et al. ............. 310/328 |
| 5,557,974 | A | * | 9/1996 | Hase et al. ............ 73/862.335 |
| 5,675,886 | A | * | 10/1997 | Hase et al. ............. 29/602.1 |
| 6,135,234 | A | * | 10/2000 | Harris et al. ............ 181/106 |
| 6,265,810 | B1 | * | 7/2001 | Ngo .................... 310/328 |
| 6,274,967 | B1 | * | 8/2001 | Zumstrull et al. ........ 310/328 |
| 6,494,288 | B1 | * | 12/2002 | Tashiro et al. .......... 181/102 |
| 6,499,471 | B2 | * | 12/2002 | Shen et al. ............. 123/498 |

FOREIGN PATENT DOCUMENTS

| DE | 38 33 109 | 4/1990 |
| DE | 6 93 338 | 7/1990 |
| DE | 38 44 134 | 2/1992 |
| DE | 36 02 673 | 4/1992 |
| GB | 2 106 001 | 4/1983 |
| JP | 63-1383 | 1/1988 |

OTHER PUBLICATIONS

"Piezopower", Von Daniel J. Jendritza, et al., pp. 38-44, TR Technische Jeft 41. 1002, Dec. 1992.

* cited by examiner

*Primary Examiner*—Thomas M. Dougherty
(74) *Attorney, Agent, or Firm*—Baker Botts L.L.P.

(57) ABSTRACT

An actuator unit has an elastically configured hollow body in which a piezoelectric actuator is biased, the hollow body being provided with holes which are of a dumb-bell shape and run transversely of the hollow body's axis.

18 Claims, 4 Drawing Sheets

Section A-A

Detail X

PIEZOELECTRIC ACTUATOR UNIT

FIELD OF THE INVENTION

The invention relates to an actuator unit with a piezoelectric actuator disposed in a hollow body, and to a hollow body for biasing a piezoelectric actuator.

DESCRIPTION OF RELATED ART

Actuator units with a piezoelectric actuator that is biased by a resilient hollow body are used, for example, in automotive technology to control injection valves in an internal combustion engine. DE 38 44 134 C2 discloses an injection valve that is operated by a piezoelectric actuator that is arranged in a cylindrical tubular spring and is biased by the latter against the casing of the injection valve. This design of the actuator unit has, however, the disadvantage that the biasing of the piezoelectric actuator depends greatly on the manufacturing tolerances of the casing of the injection valve. Furthermore, the installation of the actuator unit is complicated and requires a great amount of maintenance, since upon each installation and removal the bias applied to the piezoelectric actuator by the tubular spring has to be reset. Furthermore, in the case of tubular springs, the problem also is that, in order to achieve sufficient elasticity for the longitudinal movement of the piezoelectric actuator, the tubular springs must be made with an extremely thin wall, which impairs their strength and with it the useful life of the actuator unit.

BRIEF SUMMARY OF THE INVENTION

The present invention addresses the problem of creating an actuator unit with a piezoelectric actuator, which is suitable especially for the control of fuel injection valves, and is characterized by simple manufacture, ease of installation, great ease of maintenance and long useful life, as well as by a hollow body for biasing the piezoelectric actuator in such an actuator unit.

This problem is solved in an actuator unit according to the present invention, and in a hollow body for biasing a piezoelectric actuator according to the present invention.

In the actuator unit according to the present invention, a piezoelectric actuator is strongly biased, so that the entire component can be pre-manufactured and is furthermore easy to install, for example, in an internal combustion engine, and no re-tightening of the piezoelectric actuator will be necessary. The design of the hollow body biasing the piezoelectric actuator according to the invention with holes that are dumb-bell shaped also assures that the hollow body will have sufficient strength at the biases usually applied to the piezoelectric actuator of 800 N to 1000 N, and at the same time will be sufficiently elastic to perform the longitudinal movement produced by the piezoelectric actuator.

It is advantageous especially to design the holes on the hollow body so that the minimum distance between adjacent holes will be one to three times the wall thickness of the hollow body, which especially offers the possibility for a simple and hence inexpensive punching of the holes. Additional advantageous embodiments of the actuator unit and of the hollow body are additionally disclosed according to the present invention.

BRIEF DESCRIPTION OF THE SEVERAL VIEWS OF THE DRAWINGS

The invention is further explained with the aid of the drawing, wherein.

DETAILED DESCRIPTION OF THE INVENTION

Figure 1:
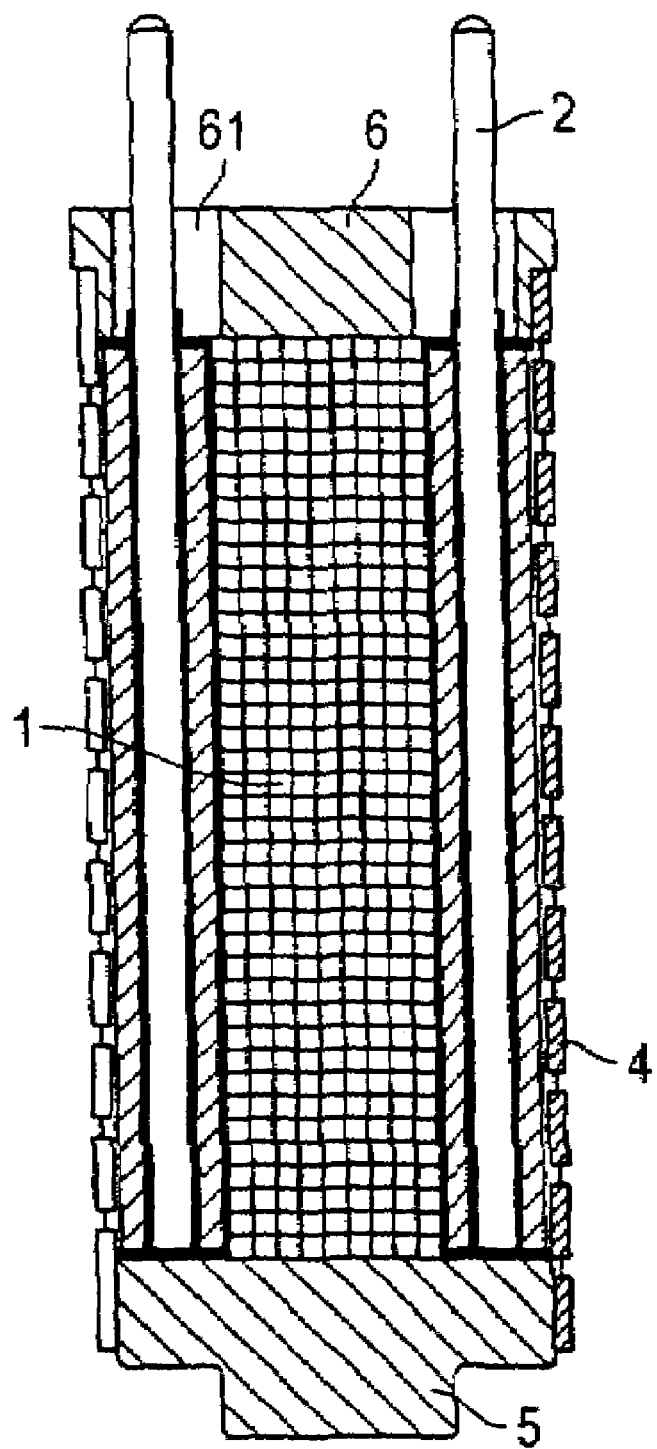
FIG. 1 is a side view of an actuator unit according to the invention.

FIG. 1 shows in cross section an actuator unit consisting of a piezoelectric actuator 1 which can be composed of a plurality of stacked piezoelectric single elements. The piezoelectric actuator 1 is operated through contact pins 2 which are arranged along the actuator and are in conductive connection with the actuator. By applying a voltage between the contact pins 2 a lengthwise expansion of the piezoelectric actuator 1 is produced, which can be utilized for operating an injection valve in an internal combustion engine. The piezoelectric actuator 1 with the contact pins 2 is disposed in a hollow body 4 configured as a tubular spring. The hollow body 4, however, can have, instead of the circular cross section represented, a rectangular profile, the shape of the hollow body being adapted to the component consisting of piezoelectric actuator and contact pins.

The piezoelectric actuator 1 is in contact at its end faces with cover plates 5 and 6, the upper cover plate 6 having bores 61 through which the contact pins 2 extend. The top and bottom cover plates 5 and 6 are tensionally or positively joined to the hollow body 4, preferably by welding. Alternatively, the joining between the hollow body 4 and the two cover plates 5 and 6 can be accomplished by beading, with the beaded upper and lower margins of the hollow body embedded into the cover plates. The piezoelectric actuator 1 is biased with a defined force of preferably 800 N to 1000 N by the two cover plates 5 and 6, which are held in position by the hollow body 4. To be able to sustain this bias, the hollow body receiving the piezoelectric actuator is made preferably from spring steel which is distinguished by a high strength characteristic. Alternatively, however, other materials can be used, e.g., materials with a low elasticity modulus, such as copper-beryllium alloys, for example.

FIGS. 2A to 2D show more precisely the construction of the hollow body 4 in the form of a tubular spring. The tubular spring has holes 41 uniformly distributed over its entire surface except for the marginal areas to which the cover plates are welded, and they are of a "dumb-bell" shape and run through the tubular spring at right angles to the axis. The holes 41 assure the sufficient elasticity of the tubular spring receiving a biased piezoelectric actuator, so that the tubular spring interferes but negligibly with the elongation caused by the piezoelectric actuator. The elasticity of the tubular spring can be adapted by the number and length of the holes 41 to the desired elongation of the biased piezoelectric actuator.

Figure 2A:
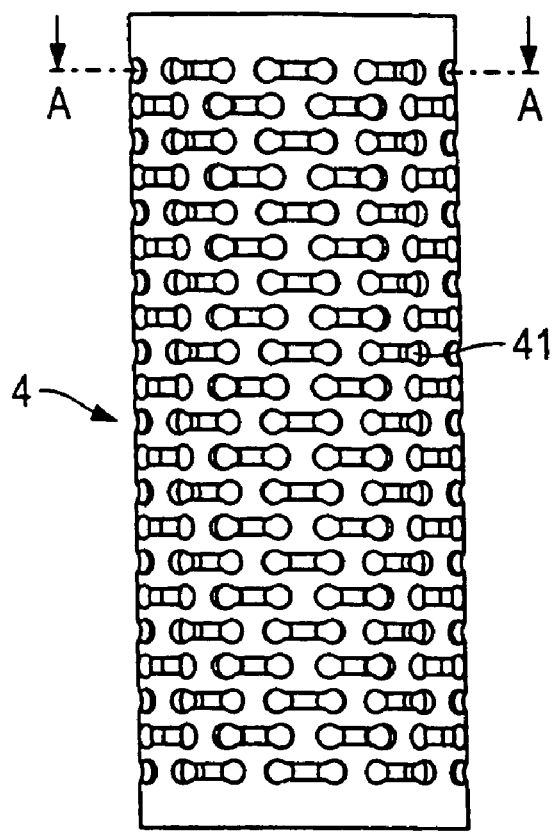
FIG. 2A an embodiment of a hollow body according to the invention for biasing a piezoelectric actuator as a tubular spring, FIG. 2B a sectional view along line A—A in the tubular spring of FIG. 2A, FIG. 2C the tubular spring of FIG. 2A represented in the unrolled state, FIG. 2D a represented of the detail X of FIG. 2C, and FIG. 3 a punching arrangement.
Figure 2B:
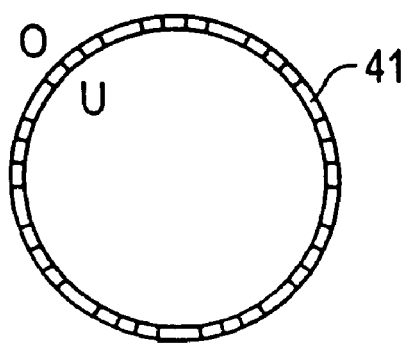
Figure 2C:
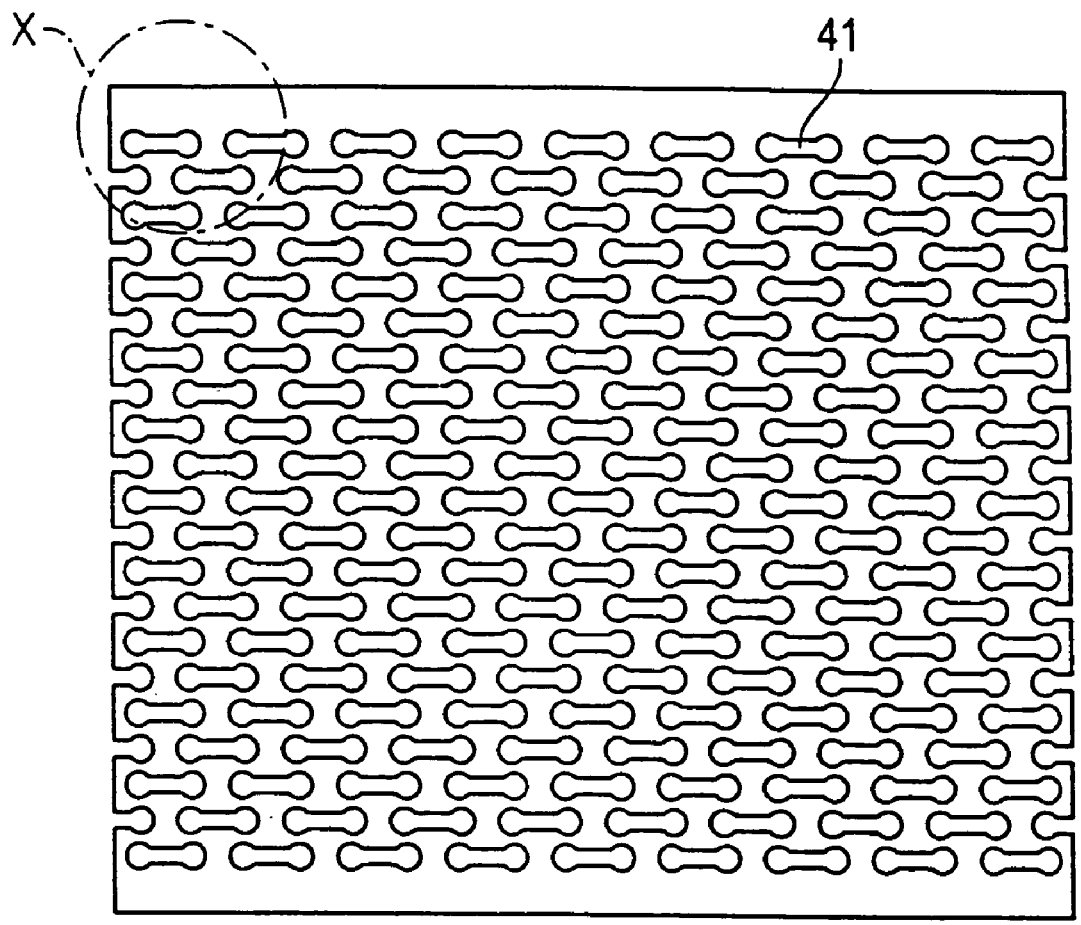
Figure 2D:
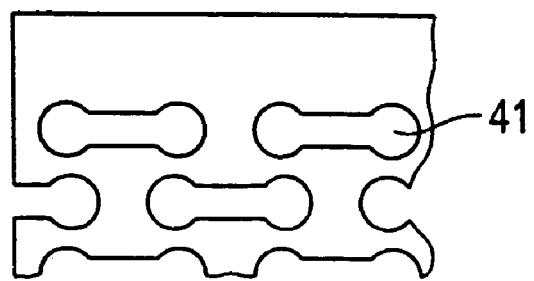

Also advantageous is the arrangement in rows of the holes 41 one over the other, shown in FIGS. 2A, 2C and 2D, wherein the individual rows are staggered in the manner of a slide fastener. In this case the holes 41 of adjacent rows are offset from one another, so that the circular end areas are all on one line and slots of the holes are opposite one another only in every other row. This arrangement assures sufficient elasticity to apply the bias to the piezoelectric actuator. The elasticity is supported especially also by the "dumb-bell"-like shape of the holes 41, in which two circular holes are connected together by a slot. Preferred size ranges are from 0.8 to 1.6 mm in diameter in the case of the circular holes, and the intervals between the centers of the holes are in the range of 1.5 to 3.5 mm. This form can furthermore be achieved very simply and precisely by punching them, for example, in a sheet of spring steel. For production reasons it is furthermore advantageous if the minimum distance between adjacent holes 41 is one to three times the wall thickness of the tubular spring.

The tubular spring is preferably made from a spring steel strip with a thickness of 0.5 mm. In a first step the holes are punched into the spring steel strip. Alternatively, it is also possible to form the holes by wire erosion, milling, drilling, or by electrochemical methods. Preferably too the marginal area around the holes is slightly bent plastically so that a strengthening of the spring steel strip is accomplished by the inherent tension thus created. This can be achieved, for example, if the punch with which the holes are made is expanded to a larger cross section after performing the punching action, so that a thickening of the marginal areas of the holes is created. In this case, furthermore, a slight bending of the burr around the holes out of the plane of the strip can occur. The marginal areas of the holes can also be strengthened by air-blasting the strip with beads.

After the holes 41 are made the spring steel strip is cut to the measure desired for the tubular spring, the holes being preferably designed, as shown in FIG. 2D, so that the cut passes through their center at the abutment edges. Then the cut piece is rolled, with the cut or punched edges on the outer side. Then the edges are deburred and the tubular form is completed by longitudinal welding with a laser. To further improve the strength of the tubular spring a heat treatment can then also be performed. As an alternative to the rectilinear abutment edges of the tubular spring, however, the abutting cut edges can be of any desired shape, e.g., the shape of a sine wave or a sawtooth shape, a correspondingly shaped weld seam being created to complete the tubular spring.

Instead of completing the tubular form by welding, the cut edges can be held together by the top and bottom cover plates 5 and 6, so that the cut edges just touch one another. This results in an advantageous distribution of the pressures and spring forces in the hollow body.

The formation of the actuator unit with an external hollow body, which is preferably in the form of a tubular spring, and in which the piezoelectric actuator is fixed in tension and/or positively to the hollow body, makes it easy to package owing to its compact design and easy to install and remove in an internal combustion engine, for example, for the control of injection valves. The formation of "dumb-bell" shaped holes running transversely of the axis of the hollow body permits an optimum adjustment of the elasticity of the hollow body to the desired longitudinal movement of the piezoelectric actuator and simultaneously a simplified production of the hollow body.

Figure 3:
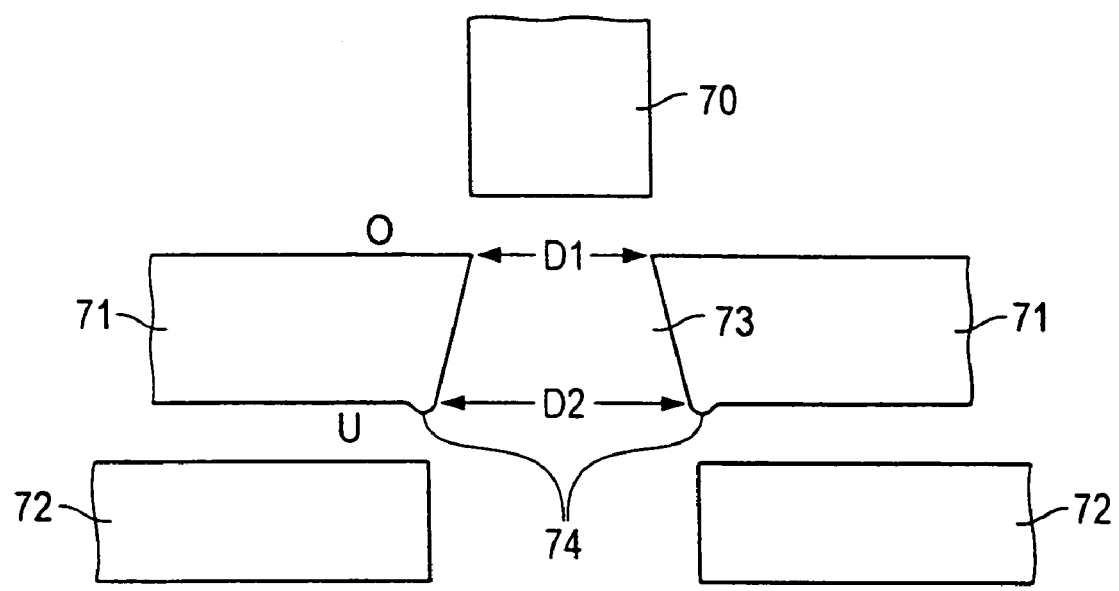

FIG. 3 shows schematically an arrangement for creating an hole 73 in a spring steel strip 71 by punching. A punch 70 is provided, which punches a hole 73 into the spring steel strip 71 lying on a die 72. Thus a piece of the spring steel strip is forced through an hole 74 in the die 72.

Due to the punching, the hole 73 has on its bottom U facing the die 72 a greater surface area D1 than on the upper side O into which the punch 70 first penetrates. In addition, the punch produces a burr 74 on the bottom U surrounding the hole 73.

The different sizes of the areas D1 and D2 of the hole 73 on the upper side O and bottom side U and/or the burr 74 result in a difference in the stiffness, hardness and spring property on the upper side O in comparison to the bottom side U of the spring steel strip 71. This is disadvantageous to uniform pressure distribution and impairs the long-term stability of the tubular spring.

To reduce this non-homogeneousness, it is advantageous when making a tubular spring as in FIGS. 2a and 2b to close the spring steel strip such that the upper side O is on the outer side of the tubular spring and the bottom side U on the inner side of the tubular spring.

With the described manner of manufacture, the surfaces D1 and D2 of the hole 73, which are different after punching, are matched to one another since the smaller area D2 is expanded on the outside by the bending and is thus enlarged, and the larger area D1 is upset and thus reduced. Thus the non-homogeneousness created in the spring steel strip by the punching process is reduced.

What is claimed is:

1. An actuator unit comprising:
   a piezoelectric actuator;
   contact pins arranged along the actuator conductive connection with said actuator; and
   a hollow body having the piezoelectric actuator disposed therein, said hollow body being elastic and biasing the actuator, wherein the hollow body is joined tensionally and/or positively to upper and lower ends of the actuator, said hollow body having holes therein of a dumbbell shape running transversely of the hollow body's axis.

2. The actuator unit according to claim 1, wherein the piezoelectric actuator is gripped in its direction of expansion between upper and lower cover plates tensionally and/or positively joined to the hollow body.

3. The actuator unit according to claim 1, wherein the holes are arranged in rows one above the other, the holes of the rows being laterally offset from one another.

4. The actuator unit according to claim 3, wherein the minimum distance between adjacent holes of two rows is one or three times the wall thickness of the hollow body.

5. The actuator unit according to claim 1, wherein the holes are distributed uniformly over the circumference of the hollow body.

6. The actuator unit according to claim 1, wherein the hollow body is made of steel and the holes are punched holes.

7. The actuator unit according to claim 1, wherein the hollow body has at least one weld seam joining together two abutting edges of the hollow body.

8. The actuator unit according to claim 1, wherein the hollow body has two abutment edges associated with one another extending and over the length of the hollow body.

9. The hollow body according to claim 1, wherein the holes are distributed uniformly over the circumference of the hollow body.

10. The hollow body according to claim 1, wherein the hollow body is made of spring steel and the holes are punched.

11. The hollow body according to claim 1, wherein the hollow body has at least one weld seam which joins together two abutting edges of the hollow body.

12. The hollow body according to claim 1, wherein the hollow body has two abutment edges which are associated with one another and extend over the entire length of the hollow body.

13. The actuator unit of claim 1, wherein the hollow body comprises a tubular spring.

14. The actuator unit of claim 1, wherein the holes of a dumb-bell shape each comprise two side-by-side circular holes joined together by a slot.

15. The actuator unit of claim 14, wherein the circular holes range from about 0.8 to 1.6 mm in diameter.

16. The actuator unit of claim 14, wherein the centers of two circular holes connected by a slot are separated by a distance in a range from 1.5 to 3.5 mm.

17. The actuator unit of claim 13, wherein the hollow body is comprised of spring steel.

18. The actuator of claim 13, wherein the hollow body is comprised of copper-beryllium alloy.

* * * * *